UNITED STATES PATENT OFFICE.

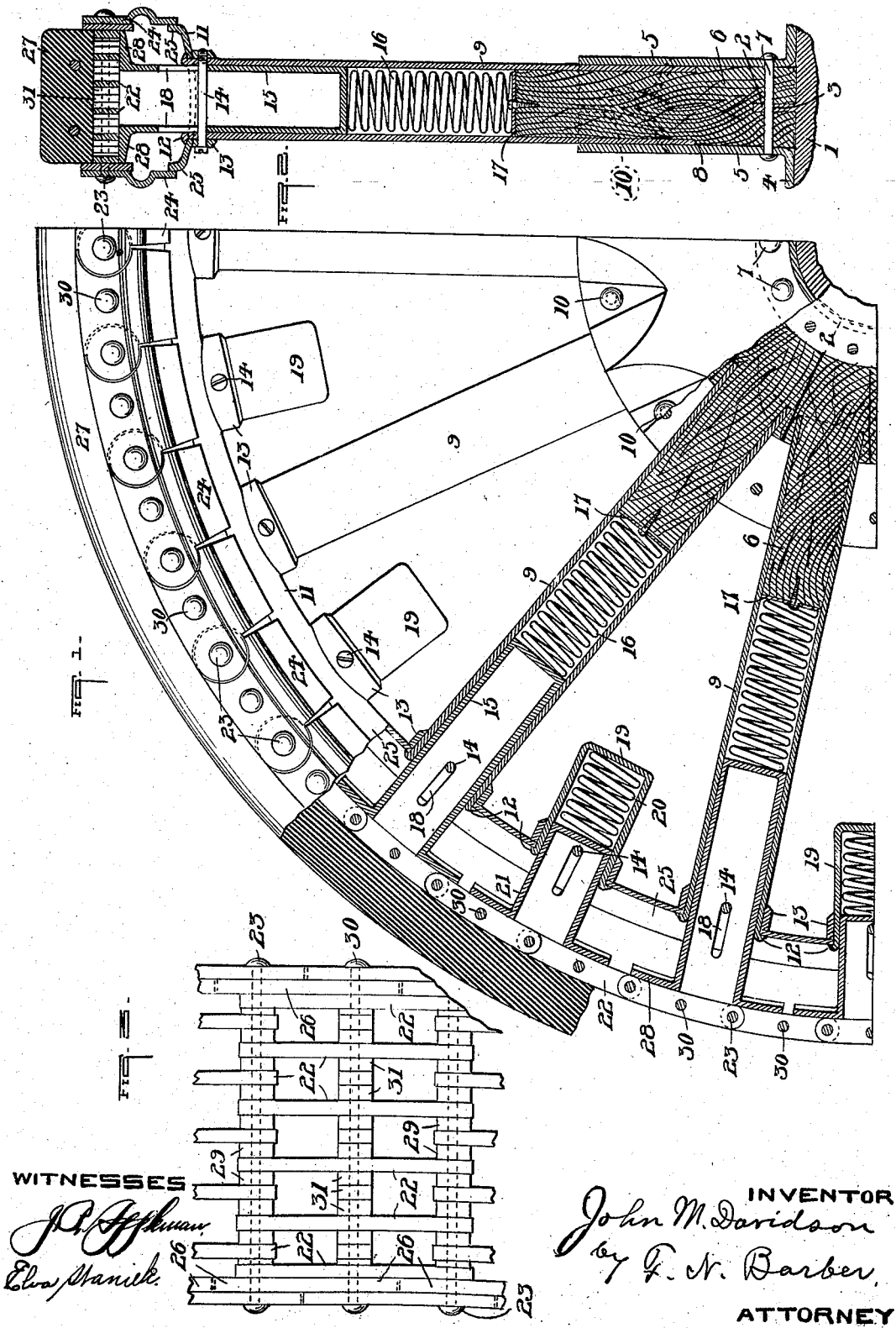

JOHN M. DAVIDSON, OF PITTSBURG, PENNSYLVANIA.

VEHICLE-WHEEL.

No. 858,795.     Specification of Letters Patent.     Patented July 2, 1907.

Application filed February 14, 1907. Serial No. 357,338.

*To all whom it may concern:*

Be it known that I, JOHN M. DAVIDSON, a citizen of the United States, residing at Pittsburg, in the county of Allegheny and State of Pennsylvania, have invented or discovered new and useful Improvements in Vehicle-Wheels, of which the following is a specification.

My invention relates to vehicle wheels, in which the vibration and jar due to irregularities of the road-bed are absorbed by springs.

It is the object of my invention to provide a wheel with a flexible tire, supported by a number of radially-arranged spring-pressed plungers seated loosely against the inner surface of the tire.

It has been proposed to provide springs between the hub and a rigid tire, so that, under the stress of a load, each axle will be eccentric to its tire and so that all irregularities of the road-way will cause the whole tire to be vibrated up and down relatively to its axle. I provide a chain tire, of which only sections will yield under the weight of the load or by reason of irregularities of the road-bed. In order to give the plungers free radial movement and at the same time hold them from lateral vibration, I prefer to seat the plungers loosely against the chain tire without providing any connecting means whatever therebetween, that is, I prefer to make the tire free on the plungers.

Referring to the drawings, Figure 1 is in part a side elevation and in part a vertical section of a wheel constructed in accordance with my present invention, portions being broken away; Fig. 2, a section taken longitudinally through the center of one of the spokes; and Fig. 3, a plan of a portion of my preferred form of chain tire.

On the drawings, 1 represents the hub of a wheel provided with a central annular flange 2 extending circumferentially around the same and provided with the holes 3. Seated on the hub are a pair of collars 4, each provided with a flange or retaining plate 5 extending at right angles to the hub and parallel to the flange 2.
The plates 5 are spaced apart as shown on the drawings and there are arranged between them the inner ends of the spokes preferably composed of wood, as shown at 6, secured to the flange 2 and the plates 5 by the bolts 7 which pass through the holes 3 and alined holes in the plates. The inner ends of the wooden sections 6 are tapered and fitted so as to lie tightly together around the hub, and are provided with the shoulders 8, on which sit the inner ends of the metallic tubular spoke sections 9, the wooden sections extending within the sections 9 preferably beyond the outer edges of the plates 5 so as to stiffen the sections 9 at said edges where the bending strain is especially severe on the spokes. The plates are bent into contact between each consecutive pair of spokes and secured together by the bolts or rivets 10, these providing rigid and strong sockets for the spokes.

The outer ends of the spokes 9 pass through the base of the felly 11 and are flanged down upon its outer face as shown at 12. The collars 13 surround the spokes 9 and fit against the inner face of the felly and are secured in place by the screws or bolts 14 passing through both the spokes and the collars. By these instrumentalities the spokes and the felly are rigidly secured together.

Reciprocable in the spokes 9 are the preferably tubular plungers 15 seated on the helical springs 16 resting on the disks 17 secured to the outer ends of the spoke sections 6. The plungers are each provided with diametrically opposite slots 18, in which the bolts 14 lie in order to permit the reciprocation of the plungers and to prevent their escape in case the tire should accidentally come off, thus preventing a great reduction in the diameter of the wheel and obviating disasters and sudden veering of the vehicle.

Between the spokes I have provided the sockets 19, containing the springs 20 seated against the bottoms of the sockets and pressing outwardly against the bottoms of the plungers 21. The sockets 19 are secured to the felly by the collars 13 and the bolts 14, just as the spokes 9 are secured to the felly, and the plungers 21 have the slots 18 with the functions of the slots 18 in the plungers 15. The slots of the plungers hold the plungers so that their outer ends all stand in a circle.

The tire consists of a chain having the intermediate narrow links 22 secured together by the pivots 23 riveted against the outer sides of the outer links 24 which are wider than the links 22 and extend inwardly so as to cover or inclose the outwardly projecting flanges 25 on the felly 11. Between the links 22 and 24 are the links 26 which extend outwardly beyond the edges of the links 22 to form a channel for the cushion tire 27, and inwardly beyond the links 22 to form a channel to receive the heads 28 of the plungers 15 and 21, these heads being flanges on the plungers conforming to the circular contour of the inner face of the chain tire. The links 22 may be assembled in various ways but I show them strung on their pivots alternately with the washers or spacers 29. The links are secured together between the pivots 23 by the rivets or bolts 30, spacers 31 being interposed between the links.

By making my flexible tire free on the plungers, the latter may freely slide back and forth in spokes and sockets. As the wheels encounter resistances, the tire yields at the part encountered without substantially affecting the concentric relation of the tire and the felly. The flexure of the tires under the weight of a load does not affect the said concentric relation. My chain tire is simple and light and readily obedient to the action of the springs. The wheel may be quickly taken apart and its parts repaired or renewed with a minimum loss of time and with a few simple tools. The flanges of the plungers bear against the sides of the channel in the chain and prevent lateral movement of the tire.

Preferably the springs will be stiff enough to prevent the wheel from departing from its circular form except when it strikes an irregularity which results in a great saving in the power required for operating the driving motor of the vehicle.

I claim—

1. In a cushion tire wheel, a series of radially-movable spring-pressed plungers, and a flexible chain tire free on the outer ends of the plungers, said chain having lateral flanges forming a channel in which the said ends of the plungers are seated.

2. In a cushion tire wheel, a series of radially-movable spring-pressed plungers having heads thereon, and a flexible chain tire free on the outer ends of the plungers, said chain having lateral flanges forming a channel in which the said heads of the plungers are seated.

Signed at Pittsburg, Pa., this 11th day of February, A. D. 1907.

JOHN M. DAVIDSON.

Witnesses:
F. N. BARBER,
ANNA R. BEATTY.